(12) United States Patent
Clarke

(10) Patent No.: US 11,446,849 B2
(45) Date of Patent: Sep. 20, 2022

(54) METHOD OF FORMING AN ARTICLE

(71) Applicant: Bockatech Ltd., Huntingdon (GB)

(72) Inventor: Peter Clarke, Huntingdon (GB)

(73) Assignee: Bockatech, Ltd., Wyton (GB)

( * ) Notice: Subject to any disclaimer, the term of this patent is extended or adjusted under 35 U.S.C. 154(b) by 0 days.

(21) Appl. No.: 17/272,699

(22) PCT Filed: Sep. 2, 2019

(86) PCT No.: PCT/EP2019/073324
§ 371 (c)(1),
(2) Date: Mar. 2, 2021

(87) PCT Pub. No.: WO2020/048912
PCT Pub. Date: Mar. 12, 2020

(65) Prior Publication Data
US 2021/0339439 A1   Nov. 4, 2021

(30) Foreign Application Priority Data
Sep. 4, 2018   (GB) ...................................... 1814355

(51) Int. Cl.
*B29C 44/42*   (2006.01)
*B29C 44/02*   (2006.01)
(Continued)

(52) U.S. Cl.
CPC ........ *B29C 44/027* (2013.01); *B29C 44/0415* (2013.01); *B29C 44/355* (2013.01);
(Continued)

(58) Field of Classification Search
CPC . B29C 44/027; B29C 44/0415; B29C 44/355; B29C 44/42; B29C 44/583;
(Continued)

(56) References Cited

U.S. PATENT DOCUMENTS 6,402,725 B1   6/2002   Clarke
2001/0036971 A1   11/2001   Usui et al.

FOREIGN PATENT DOCUMENTS

| WO | 1998/17456 A1 | 4/1998 |
| WO | 2003/006226 A1 | 1/2003 |
| WO | 2017/134181 A1 | 8/2017 |

OTHER PUBLICATIONS

International Preliminary Report on Patentability in related international application No. PCT/EP2019/073324 dated Mar. 9, 2021.
(Continued)

*Primary Examiner* — Jeffrey M Wollschlager
*Assistant Examiner* — Xue H Liu
(74) *Attorney, Agent, or Firm* — Polsinelli, P.C.

(57) ABSTRACT

Method of forming an article from a molten plastic composition including a polymer and a blowing agent. The method provides that during an injecting step (c) and a packing step (d), the injection pressure and the packing pressure, respectively, are maintained above a minimum pressure threshold in at least one second region of the cavity to maintain the physical blowing agent as a gas dissolved in the polymer so that substantially no gas bubbles are formed in the at least one second region, during a mould opening step (e), at least some of the molten plastic composition is exposed to an external pressure lower than a minimum pressure threshold to form in the article at least one first portion having expanded cellular foam formed from the plastic composition, and prior to the opening step (e), the plastic composition in the at least one second region of the cavity has been cooled so as to be fully solidified to form in the article at least one second portion having a substantially homogeneous, solid phase, unexpanded plastic composition.

13 Claims, 1 Drawing Sheet

(51) Int. Cl.
　　　　*B29C 44/04*　　　　(2006.01)
　　　　*B29C 44/34*　　　　(2006.01)
　　　　*B29C 44/58*　　　　(2006.01)
　　　　*B29K 23/00*　　　　(2006.01)
　　　　*B29L 31/00*　　　　(2006.01)

(52) U.S. Cl.
　　　　CPC ............ *B29C 44/42* (2013.01); *B29C 44/583* (2013.01); *B29K 2023/12* (2013.01); *B29K 2995/0025* (2013.01); *B29K 2995/0026* (2013.01); *B29K 2995/0029* (2013.01); *B29L 2031/7132* (2013.01)

(58) Field of Classification Search
　　　　CPC ........ B29K 2023/12; B29K 2995/0025; B29K 2995/0026; B29K 2995/0029; B29L 2031/7132
　　　　USPC .......................................................... 264/54
　　　　See application file for complete search history.

(56) References Cited

OTHER PUBLICATIONS

Examination Report in related Indian Application No. 202147010203 dated Jan. 17, 2022.
Search and Examination report in related GB application No. GB1814355.2 dated Feb. 14, 2019.
International Search Report and Written Opinion in related international application No. PCT/EP2019/073324 dated Dec. 6, 2019.
"Plastiscope" from Modem Plastics International, Oct. 1996.

METHOD OF FORMING AN ARTICLE

FIELD OF THE INVENTION

The present invention relates to the formation of foamed plastic articles, e.g. cups or containers for food.

BACKGROUND

In the packaging industry, a commonly-used type of disposable cup (for example, take-away coffee cups) is a paper cup with an inner lining of a plastic material, e.g. low-density polyethylene (LDPE). As these cups are made of two different materials which can be difficult and/or costly to separate, their recycling can prove challenging. Furthermore, as there is a seam down one side of the cup where the paper material is joined together, liquid may leak from the area of the join at the rim of the cup when the cup is tilted for consuming the beverage within (particularly when the cup is used in connection with a lid having a mouthpiece through which the beverage passes for consumption).

Efforts have been made in the industry to provide disposable polypropylene cups. In conventional injection moulding a thick wall is required to create some thermal insulation in a cup. Typically, a cellular structure provides the thermal insulation, and a blowing agent is added to the thermoplastic polymer to create a foamed structure to further improve the thermal insulation, and to reduce the density of the foamed wall.

WO-A-2017/134181 discloses an article, and a method of forming the article, in which the article is a polypropylene cup which has expanded and unexpanded regions. The expanded regions become translucent, as a result of the cellular foam being formed in those regions. It is also disclosed that the unexpanded regions become translucent, because there is some formation of expanded cells in those regions. It is desirable that the unexpanded regions become transparent, i.e. visually clear, as a result of the absence of cellular foam being formed in those regions. However, it can be difficult to control the process to achieve transparent, or visually clear, unexpanded regions.

The present invention aims at least partially to overcome the problem of achieving both translucent expanded cellular foam regions and transparent, i.e. visually clear, unexpanded regions in an article.

SUMMARY OF THE INVENTION

The present invention provides a method of forming an article.

The method of the present invention forms an article that may have any shape, morphology or function. However, the present invention has particular application in the manufacture of hollow articles, such as a cup, or any other container or vessel for containing a liquid.

Advantages of present invention are that the article formed by the method is easily recyclable and reusable, has a high level of stiffness provided by the expanded regions, and also possesses good thermal insulation properties provided by the expanded regions, yet incorporates unexpanded regions which can provide structural and/or aesthetic properties to the article.

The unfoamed regions are transparent, or visually clear.

The present invention is at least partly predicated on the finding by the present inventor that the control of the pressure during the injection and packing phases in relation to a minimum threshold pressure can reliably ensure that regions of the article are unexpanded after the article has been exposed to a reduced pressure, for example atmospheric pressure, during the expansion to form the expanded regions.

The present inventor has also found that the articles produced by the method of the present invention also have the level of stiffness required for such articles, despite the reduction in the amount of material used therein. It has been found that as the cellular foamed plastic composition, typically a thermoplastic polymer such as a polyolefin, typically polypropylene, cools slowly, due to its thermal insulation qualities, the crystallinity of the plastic composition can increase, which in turn can increase the rigidity of the cellular foamed plastic composition. The expansion of the molten plastic composition between the first and second skins by foaming also provides the articles with good thermal insulation properties.

Also, since the entire container may be made of a single layer of recyclable material (i.e. no layers of different materials which need to be separated), the container is easier to recycle than the commonly used plastic-lined paper cups.

Furthermore, as the articles are injection moulded in the methods of the present invention, there is no join present in the article through which leakage of a liquid contained therein could occur.

BRIEF DESCRIPTION OF THE FIGURES

Embodiments of the present invention will now be described by way of example only with reference to the accompanying drawings, in which.

DETAILED DESCRIPTION

Figure 1:
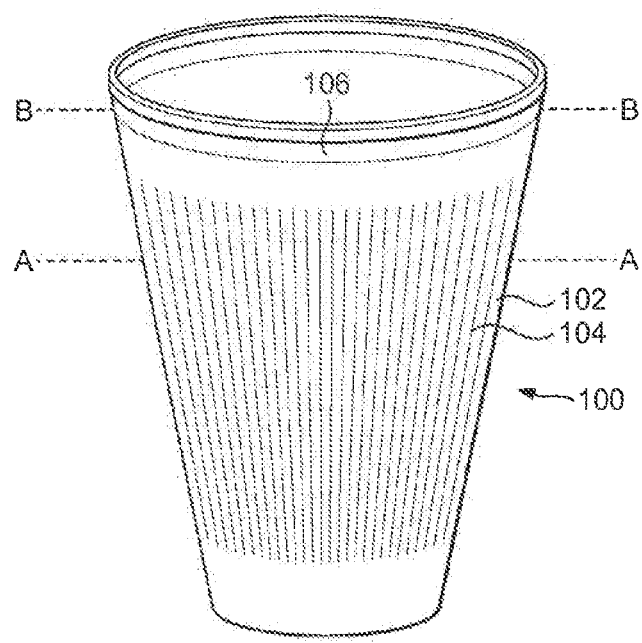
FIG. 1 is a side view of a cup formed by the method of an embodiment of the present invention.

Referring to FIG. 1, there is shown a side view of an article, for example, a cup such as a coffee cup, formed by the method of the present invention.

The cup 100 has an annular sidewall 102 having an annular expanded foam region 104 and an annular unexpanded region 106. In this specification, the term "annular" means "generally ring-like", is not limited to geometrically circular shapes, and encompasses shapes that may be circular or other than circular, for example elliptical, polygonal, etc. The expanded foam region 104 typically has a thickness of from 1 to 4 mm, optionally from 1 to 3 mm. The unexpanded region 106 typically has a thickness of from 0.25 to 0.75 mm, optionally from 0.25 to 0.5 mm.

The expanded foam region 104 appears translucent to the naked eye because the expanded cellular foam includes cells that have cellular walls that reflect visible light. However, if a pigment is incorporated into the thermoplastic polymer at a high concentration, the expanded region 104 may typically appear opaque, with a solid colour.

In contrast, the unexpanded region 106 has no cells, or if any cells are present, for example at a low concentration, they have a cell size of typically less than 0.5 microns and therefore are not visible to the naked eye, and consequently the unexpanded region 106 appears transparent to the naked eye. The unexpanded region 106 appears transparent to the naked eye, since the blowing agent, in this embodiment $CO_2$ gas, has stayed in solution in the polymer, in this embodiment polypropylene, during manufacture of the article. After the molten polymer has solidified, it is not possible for cells to form as a result of any action of the blowing agent.

The present invention concerns the reliable manufacture of such an article which comprises both a translucent expanded foam region 104 and a transparent unexpanded region 106.

Figure 2:
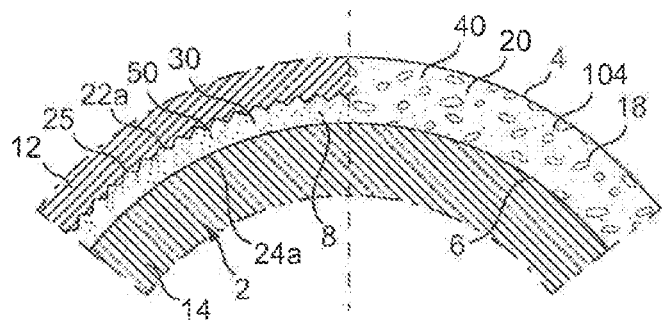
FIG. 2 is a cross-section on line A-A of a first part of the cup of FIG. 1 illustrating the appearance of an expanded translucent region of the cup at different stages in the method of the present invention.

Referring to FIG. 2, there is shown a cross-section on line A-A illustrating the appearance of the expanded region 104 at different stages in the method of the present invention.

Figure 3:
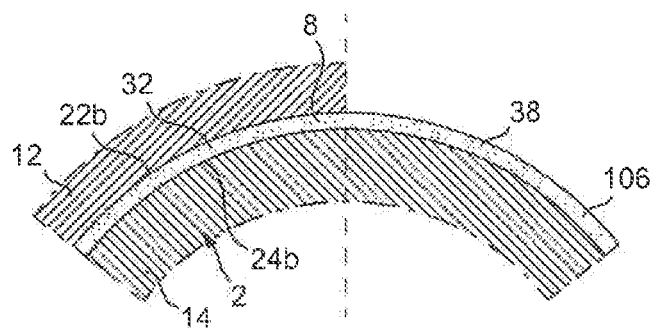
FIG. 3 is a cross-section on line B-B of a second part of the cup of FIG. 1 illustrating the appearance of an unexpanded transparent region of the cup at different stages in the method of the present invention.

In FIGS. 2 and 3, distances are exaggerated for the sake of clarity of illustration.

Referring to the left-hand side of FIG. 2, the expanded region 104 of the article is formed using a mould 2 having a first annular outer part 12 and a second annular inner part 14. The first and second parts 12, 14 having respective first and second cavity-forming surfaces 22a, 24a. The first cavity-forming surface 22a of the outer part 12 of the mould comprises corrugations 25, the corrugations 25 in the first cavity-forming surface 22a having peaks and troughs, for example in the form of a sinusoidal wave. The sinusoidal wave may have a variety of different configurations with respect to the shape and morphology of the peaks and troughs. The second cavity-forming surface 24a is preferably smooth and without any undulations.

The mould 2 is closed thereby defining a first region 30 of a cavity 8 between the first and second cavity-forming surfaces 22a, 24a. A molten plastic composition 50, comprising a polymer and a physical blowing agent, is injected into the cavity 8. The physical blowing agent is a gas dissolved in the polymer.

In the embodiment of the present invention, the polymer of the plastic composition may comprise a polyolefin or blend of a plurality of polyolefins, optionally polyethylene or polypropylene; or a polyester, optionally polyethylene terephthalate or polybutylene terephthalate; or polylactic acid. In the preferred embodiment, the polymer comprises polypropylene. Polypropylenes having a Melt Flow Index (MFI) of from 10 to 120 are particularly preferred. The Melt Flow Index of a polymer can be measured according to ASTM D1238.

Blowing agents which can be used in the embodiment of the present invention include physical blowing agents in the form of a gas dissolved in the molten plastic composition. Such a gas may comprise, for example, carbon dioxide. The gas may optionally further include a perfume composition (i.e. a scent) which remains present in the polymer material after expansion, to enhance the consumer experience.

When using carbon dioxide as the blowing agent, $CO_2$ gas is produced by the blowing agent in the extruder of the injection moulding machine, and the $CO_2$ gas then goes into solution during the injection phase (typically from 300 to 500 bar) due to the relatively high pressure exerted on the material being greater than the pressure required (typically greater than 75 bar) to force $CO_2$ into solution within molten thermoplastic resin, such as polypropylene.

The molten plastic composition is injected at an injection pressure $P_{injection}$. Typically, the injection pressure $P_{injection}$ is at least 150 bar.

After the injecting step, a packing pressure, $P_{packing}$, is applied to the cavity 8 in a packing step.

Typically, packing pressure $P_{packing}$ is at least 150 bar.

During at least one or both of the injecting step (c) and the packing step (d), the injected plastic composition 50 in contact with the first and second cavity-forming surfaces 22a, 24a is cooled to form first and second solid skins 4, 6 respectively adjacent to and in contact with the first and second cavity-forming surfaces 22a, 24a.

After the packing step (d) in the at least one first region 30 of the cavity 8 at least some of the plastic composition between the first and second solid skins 4, 6 remains molten.

During the injecting step (c) and the packing step (d), the injection pressure $P_{injection}$ and the packing pressure packing $P_{packing}$, respectively, are above a minimum pressure threshold, $P_{threshold}$, in the first region 30 of the cavity 8. Typically, the minimum pressure threshold $P_{threshold}$ is 75 bar. This prevents, in the first region 30, the physical blowing agent from coming partly out of solution in the polymer so that cellular gas bubbles are not formed in the first region 30 during the injecting step (c) and the packing step (d).

Referring to the right-hand side of FIG. 2, thereafter, the mould 2 is opened before the molten plastic composition between the first and second solid skins 4, 6 has solidified in the at least one first region 30 of the cavity 8.

This first region 30 of the mould cavity 8 is thick, and so the molten polymer resin requires a relatively long time period, longer than the injection and packing steps, to cool and solidify. Also, this first region 30 can be additionally heated by an external heater to maintain the polymer resin in a molten liquid phase.

During the opening step (e), at least some of the molten plastic composition is exposed to an external pressure lower than the minimum pressure threshold, for example atmospheric pressure, to form in the article at least one first portion comprising expanded cellular foam formed from the plastic composition.

This opening step thereby allows the molten plastic composition between the first and second solid skins 4, 6 to expand by foaming to form an expanded cellular foam 20. The opening step comprises removing the first part 12 of the mould 2 so that the first solid skin 4 is no longer in contact with the first cavity-forming surface 22a, while maintaining the second solid skin 6 in contact with the second cavity-forming surface 24a. In the illustrated embodiment, this opening is achieved by removing the outer part 12 of the mould 2, exposing the first skin 4 to atmospheric pressure and leaving the second skin 6 on the inner part 14. However any other configuration to open the mould may be used.

The right-hand side of FIG. 2 shows the first solid skin 4, the second solid skin 6, and the plastic composition 50 between the first and second solid skins 4, 6, which plastic composition 10 has expanded by foaming to form cells 18 in a solid matrix 40, and has then solidified. In the right-hand side of FIG. 2, the outer part 12 of the mould has been removed from the article and the article remains on the inner part 14 or core.

As can be seen, the expansion has resulted in the areas formed in the first solid skin 4 being "blown out" so that the distance between the first and second solid skins 4, 6 of the finished article 28 is substantially constant around the circumference of the article. The blowing gas has come out of solution in the polymer so as to form an expanded cellular foam.

The pressure acts to push the first, outer, solid skin 4 away from the second, inner, solid skin 6. The pushing apart of the first and second skins 4, 6 is at the areas which have retained a high concentration of blowing agent, which comes out of solution and is therefore expanded. The expanded sidewall may have the ribbed structure disclosed in WO-A-2017/134181.

Referring to FIG. 3, there is shown a cross-section on line B-B illustrating the appearance of the unexpanded region 106 at corresponding stages in the method of the present invention.

As for FIG. 2, referring to the left-hand side of FIG. 3, the unexpanded region 106 of the article is formed using the mould 2 having the first annular outer part 12 and the second annular inner part 14.

The mould 2 is closed thereby defining a second region 32 of the cavity 8 between the first and second cavity-forming surfaces 22b, 24b. The first and second cavity-forming surfaces 22b, 24b form a narrow cavity region 32 and are preferably smooth and without any undulations.

During the injecting step (c) and the packing step (d), the injection pressure and the packing pressure, respectively, are maintained above the minimum pressure threshold in the second region 32 of the cavity 8 to maintain the physical blowing agent as a gas dissolved in the polymer so that substantially no gas bubbles are formed in the second region 32, Prior to the opening step (e), the plastic composition in the second region 32 of the cavity 8 is cooled so as to be fully solidified, to form in the article at least one the unexpanded region 106 comprising a substantially homogeneous, solid phase, unexpanded plastic composition.

This second region 32 of the mould cavity 8 is thin, and so the molten polymer resin requires a relatively short time period, shorter than the injection and packing steps, to cool and solidify. Also, this second region 32 can be additionally cooled by an external cooler to transition the polymer resin from the molten liquid phase into a solid phase.

Therefore, optionally between the injection step (c) and the opening step (e) the at least one second region 32 of the cavity 8 is subjected to a cooling step (f) to cool the plastic composition in the at least one second region 32 below the melting temperature of the plastic composition throughout the thickness of the cavity 8 in the at least one second region 32.

During at least one or both of the injecting step (c) and the packing step (d), in the second region 32 of the cavity 8 the injected plastic composition in contact with the first and second cavity-forming surfaces 22b, 24b is cooled to form not only first and second solid skins 4, 6 respectively adjacent to and in contact with the first and second cavity-forming surfaces 22b, 24b, but also a solid wall 38 throughout its thickness across the width 40 of the second region 32 of the cavity 8.

After the packing step (d) in at least one second region 32 of the cavity 8 the entire thickness of the plastic composition between the first and second solid skins 4, 6 is solidified.

Referring to the right-hand side of FIG. 3, thereafter, the mould 2 is opened after the molten plastic composition between the first and second solid skins 4, 6 has solidified in the at least one second region 32 of the cavity 8.

After the opening step, the solid plastic composition between the first and second solid skins 4, 6 cannot expand further by foaming, and cannot form an expanded cellular foam. Therefore the unexpanded region 106 appears transparent to the naked eye.

In both the first and second aspects of the present invention, the article may be a cup or container, e.g. a coffee cup or a container suitable for warming soup in a microwave. The articles may be disposable or reusable, and in either case is recyclable since the article is composed of a single polymer, for example polypropylene.

Various modifications to the illustrated embodiments will be apparent to those skilled in the art and are intended to be included within the scope of the present invention.

The invention claimed is:

1. A method of forming an article, the method comprising:
(a) providing a mould having a first part and a second part, the first and second parts having respective first and second cavity-forming surfaces;
(b) closing the mould thereby defining a cavity between the first and second cavity-forming surfaces;
(c) injecting a molten plastic composition comprising a polymer and a physical blowing agent into the cavity, wherein the physical blowing agent is a gas dissolved in the polymer, the molten plastic composition being injected at an injection pressure;
(d) after the injecting step, applying a packing pressure to the cavity in a packing step, wherein during at least one or both of the injecting step (c) and the packing step (d), the injected plastic composition in contact with the first and second cavity-forming surfaces is cooled to form first and second solid skins respectively adjacent to and in contact with the first and second cavity-forming surfaces, and wherein after the packing step (d) in at least one first region of the cavity at least some of the plastic composition between the first and second solid skins remains molten;
(e) opening the mould before the molten plastic composition between the first and second solid skins has solidified in the at least one first region of the cavity, thereby allowing the molten plastic composition between the first and second solid skins to expand by foaming to form an expanded cellular foam, wherein the opening step comprises removing the first part of the mould so that the first solid skin is no longer in contact with the first cavity-forming surface, while maintaining the second solid skin in contact with the second cavity-forming surface,
wherein during the injecting step (c) and the packing step (d), the injection pressure and the packing pressure, respectively, are maintained above a minimum pressure threshold in at least one second region of the cavity to maintain the physical blowing agent as a gas dissolved in the polymer so that substantially no gas bubbles are formed in the at least one second region,
during the opening step (e), at least some of the molten plastic composition is exposed to an external pressure lower than the minimum pressure threshold to form in the article at least one first portion comprising expanded cellular foam formed from the plastic composition, and
wherein prior to the opening step (e), the plastic composition in the at least one second region of the cavity has been cooled so as to be fully solidified to form in the article at least one second portion comprising a substantially homogeneous, solid phase, unexpanded plastic composition.

2. The method of claim 1, wherein the at least one second portion is transparent in visible light.

3. The method of claim 1, wherein the at least first portion is translucent or opaque in visible light.

4. The method of claim 1, wherein the polymer is polypropylene.

5. The method of claim 1, wherein the minimum pressure threshold is 75 bar.

6. The method of claim 1, wherein the blowing agent is carbon dioxide.

7. The method of claim 1, wherein during the injecting step (c) the injection pressure is at least 150 bar.

8. The method of claim 1, wherein during the packing step (d) the packing pressure is at least 150 bar.

9. The method of claim 1, wherein during the opening step (e) the first solid skin is exposed to the atmosphere and the external pressure is atmospheric pressure.

10. The method of claim 1, wherein between the injection step (c) and the opening step (e) the at least one second region of the cavity is subjected to a cooling step (f) to cool the plastic composition in the at least one second region below the melting temperature of the plastic composition throughout the thickness of the cavity in the at least one second region.

11. The method of claim 1, wherein the article is a hollow article and the first and second parts have respective first and second annular cavity-forming surfaces and in step (b) the cavity is an annular cavity between the first and second annular cavity-forming surfaces.

12. The method of claim 11, wherein the first and second parts are, respectively, outer and inner parts forming outer and inner surfaces of the hollow article.

13. The method of claim 11, wherein the hollow article is a cup, mug, bottle, basin, bowl, or container or vessel for containing a liquid.

* * * * *